ABSTRACT OF THE DISCLOSURE

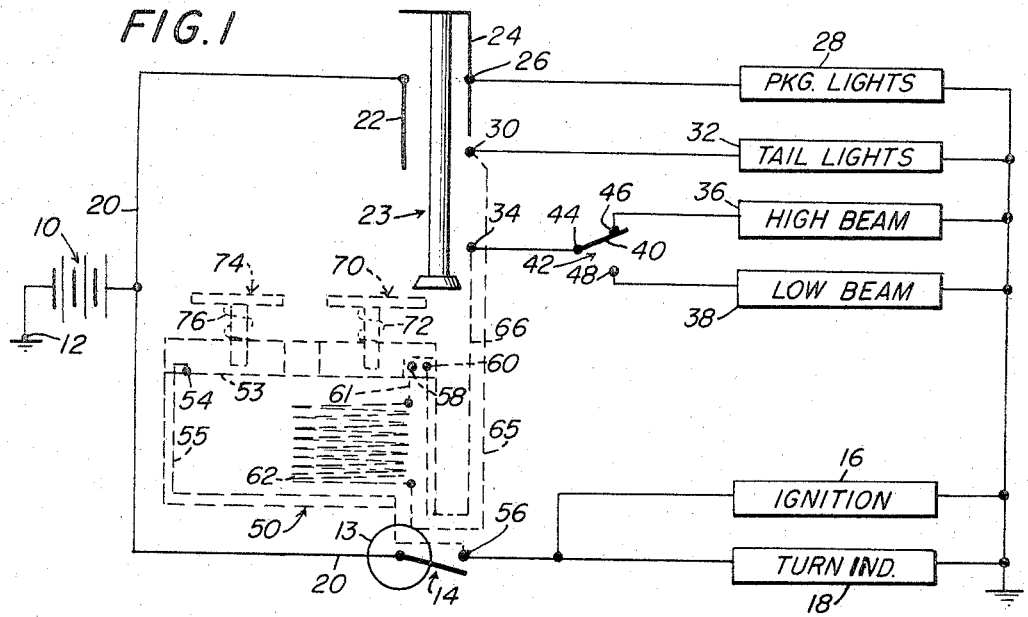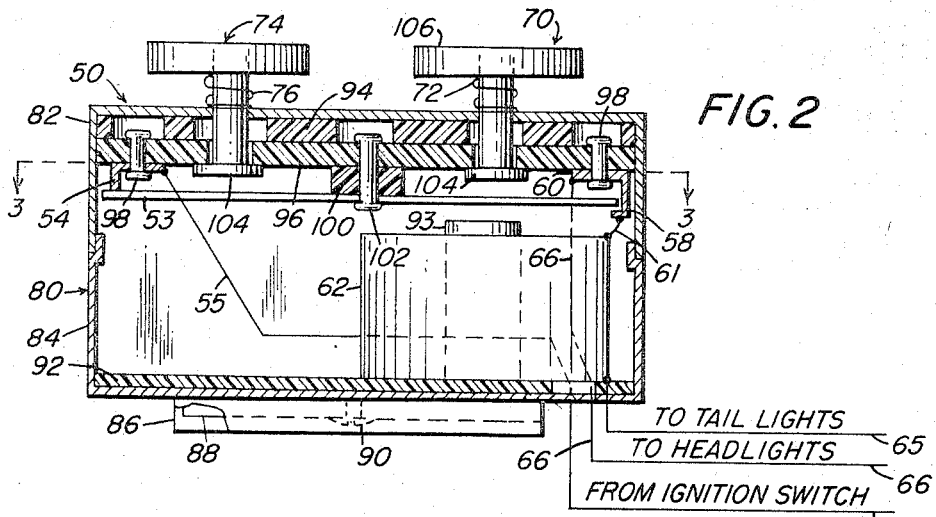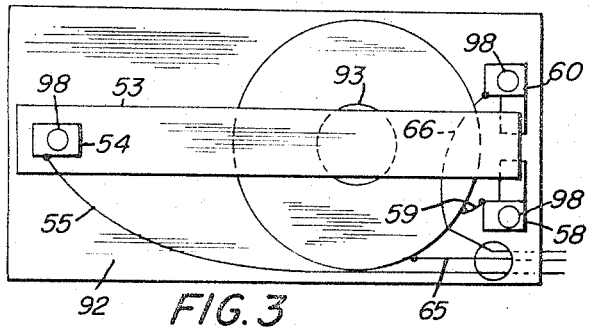
INVENTOR
CLARENCE M. CREWS 3,337,768
MEMORY SYSTEM AND MEMORY SWITCH UNIT
FOR CONTROLLING AUTOMOTIVE RUNNING
LIGHTS
Clarence M. Crews, 4706 N. Pacific Highway,
Central Point, Oreg. 97501
Filed July 27, 1964, Ser. No. 385,198
11 Claims. (Cl. 315—82)

A battery protective, running light control system is provided for automobiles through which (a) turning off of the ignition switch turns off the running lights, and (b) turning on of the running lights always requires (1) turning on of the ignition switch, followed by (2) manual turning on of a memory switch. The lights can never be left on unintentionally, and can never be turned on unintentionally.

An accessory unit is provided for installation in existing vehicles to provide the novel system as a supplement to, or as a substitute for, the conventional system.

---

This invention relates to a comprehensive, battery protective, operating and controlling system for all the running lights of an automotive vehicle, and more particularly to novel means for assuring that all operating running lights, including the high beam and the low beam headlights, and the tail lights, will be extinguished by the operation of the ignition switch actuator to the normal non-operating position (in which the key may be withdrawn from, and inserted in, the actuator), and will remain extinguished until (1) the ignition switch actuator has been returned to a conducting position such as the engine operating position and then (2) an associated, normally open, memory switch, through which all the electrical energy furnished by said system to the running lights is required to be transmitted, has been manually closed, and has been releasably secured in closed condition.

There is relatively little likelihood of leaving on the running lights when parking after dark, because the lights are then conspicuous, and the operator is in the habit of giving due attention to the lights at night. Even at night, however, nearly everyone has the experience sooner or later of neglecting the lights, only to find, on returning to the vehicle, that the battery has been drained, and that the starter will not turn the engine over. Far more frequently, however, the running lights are inadvertently left on after they have been used in the daytime under extremely foggy conditions, after they have been turned on in the daytime for a tunnel, or after they have been turned on before dawn for a drive which ends in daylight. In the daytime the fact that the running lights, and the dashboard lights are on is hardly perceptible to the driver, and since the driver is not in the habit of turning off the lights in the daytime, it is not surprising that this detail is frequently overlooked. The resulting drained battery involves embarrassment, inconvenience and expense. Besides missing an appointment, and wasting valuable time, the driver may be put to the expense and inconvenience of securing a push or a tow, and either of having the battery recharged or of buying a new battery.

Reduced to its simplest terms, the invention is applicable to an automotive vehicle (a) having electric running lights, (b) propelled by an internal combustion engine having an electrical ignition system, an ignition switch, and an ignition switch actuator which is operable between an operating position and a normal non-operating position in which a key may be inserted in, and withdrawn from, the actuator, and (c) equipped with a storage battery for furnishing electrical energy to the ignition system and to the running lights.

The invention is directed broadly to a comprehensive control system for all the running lights which causes all illuminated running lights, either high beam or low beam headlights, and the tail lights, to be extinguished by the mere turning of the ignition switch actuator to the normal non-operating position, but in which the restoration of the ignition switch actuator to operating position is not effective to reenergize the running lights, it being necessary thereafter manually to operate a normally open memory switch to a closed condition. A holding means is provided for retaining the normally open, manually closed memory switch in closed condition. The holding means is rendered ineffective and inoperable by the movement of the ignition switch to the normal non-operating position, but may be again rendered operable by the restoration of the ignition switch actuator to engine operating position, and may have its effectiveness restored by thereafter manually closing the memory switch.

It is a still further object to provide for the voluntary opening of the memory switch, even while the ignition switch remains closed, so that the running lights can be manually turned off without need for disturbing the ignition switch upon emerging from a tunnel, upon the dissipation of fog, or upon the dawning of a new day.

While the invention is most desirably embodied as standard factory equipment in new vehicles, it is an important object to contrive a simple, compact memory switch unit by means of which the novel system can be applied to existing vehicles quickly, conveniently, effectively and at small expense preferably without impairing the availability and the functioning of the conventional, factory provided, light controlling system in any way.

While the novel memory switch is most useful in the daytime, it can also be used with advantage for night driving, since it guards against the leaving on of the running lights at night. It can do everything that the conventional switch can do, with reference to the running lights, with the added advantage that it positively avoids draining of the battery.

In case of accident, the memory switch can even be used to operate the headlights and tail lights with the motor dead, by first closing the ignition switch without starting the motor, and then closing the memory switch.

Other objects and advantages will hereinafter appear.

In the drawing forming part of this specification,

FIGURE 1 is a view illustrating diagrammatically a practical and advantageous application and embodiment of the invention, with everything that is old and conventional shown in full lines, and the novel memory switch and circuitry shown in broken lines;

FIGURE 2 is an enlarged horizontal, sectional view as seen from below, of a presently preferred form of compact memory switch accessory unit which is adapted to be applied to the dashboard of an automobile;

FIGURE 3 is a sectional view taken on the line 3—3 of FIGURE 2, looking in the direction of the arrows; and FIGURE 4 is a fragmentary view in elevation of the dashboard of a vehicle with the accessory memory switch unit applied to it.

The presently conventional, relevant parts of an ignition and lighting system will first be briefly described and explained.

A storage battery 10 has its negative terminal grounded at 12. The ungrounded terminal of the battery may be connected and disconnected at will through a manually operable, key controlled actuator 13 of switch 14 to render the ignition circuit (represented by block 16) active and inactive. When active the ignition circuit is completed through ground. The moving of the ignition switch actuator to operating position for closing the ignition switch 14 renders other circuits active, besides the ignition circuit, for example, the turn indicator circuit (represented by the block 18). As shown, the turn indicator circuit 18 is connected to ground in parallel with the ignition circuit 16.

The battery is also normally connected through a conductor 20 to an input terminal 22 which forms part of a combined parking light, tail light, and headlight switch 23. A slide contact 24 normally stands in an "off" position, as shown. When the parking lights are wanted, the slide 24 is moved into a parking light position in which it conductively connects terminal 22 with contact 26. In this position of the slide, current flows from contact 26 through the parking light circuit (represented by block 28), to ground.

Movement of the slide to the parking light position referred to also causes the slide contact member 24 conductively to connect input contact 22 with an output contact 30. This causes current to flow through the tail light circuit (represented by block 32). The tail lights are maintained in an energized condition when the slide contact is further moved to extinguish the parking lights and to energize the headlights.

When the headlights are wanted, the slide 24 is shifted into headlight position in which it conductively connects input contact 22 with output contact 34. Current now flows either through the high beam headlight circuit, represented by block 36, to ground, or through the low beam headlight circuit, represented by block 38, to ground.

The course taken by the current after passing through contact 34 is determined by the position of the movable member 40 of a two-position, beam selector switch 42. The switch member 40 is normally operated by a foot button and cyclical mechanism (neither shown), the movable member 40 shifting from "up" to "down" and from "down" to "up" at alternate actuations of the button. As shown, the member 40 is in the "up" or raised beam position, in which it conductively connects terminal 44 with 46 for energizing the high beam circuit 36. In the "down" position the member 40 conductively connects terminal 44 with terminal 48 for energizing the low beam circuit 38.

A point which should be particularly noted is the fact that under the conventional arrangement now being described, the headlights can be turned on only by closing the switch 22–24–34, that that switch will turn on the headlights any time that it is closed, and that the headlights will stay on until the switch is opened or the battery runs down. The switch 22–24–34 is not a switch which the driver is habitually required to turn off when parking during daylight hours, nor is it a switch which is necessarily turned off for a reason connected with the operation of the motor. For night driving the conventional arrangement described is passable but poor, but for dealing with the daylight fog problem, or with the tunnel problem, or with the night and day trip problem, the conventional arrangement is susceptible of radical improvement. The conventional switch 23 would normally occupy the off position when the novel memory system of this invention is in use.

While the novel operating and controlling system now to be described can be readily and inexpensively embodied as standard or optional equipment by the vehicle manufacturer, it is shown herein as realized through the addition of a simple and inexpensive memory switch unit 50, applied in a position conveniently accessible to the driver, to the dashboard 52 of a presently conventional automobile. As illustrated, this is a stick relay switch unit, as will be made clear. The memory switch system will first be described chiefly by reference to FIGURES 1 and 3, which could apply either to factory or accessory equipment, and the mechanical structure of the accessory unit 50 will then be described in further detail.

A movable, conductive switch component 53 desirably composed, in part at least, of ferromagnetic material is fixedly mounted, midway of its length, in an insulated manner. The left free end of the switch component 53 normally presses resiliently forward in engagement with a stationary contact 54, the contact 54 being suitably connected through a conductor 55 with the output contact 56 of the ignition switch 14.

The opposite free end of the switch component 53 normally stands spaced a short distance behind a pair of fixed switch output contacts 58 and 60, and when forced forward it simultaneously engages these contacts. The contact 58, as illustratively shown in FIGURES 1 to 3, is connected through a conductor 61, a relay winding 62 and a conductor 65 to the terminal 30 through which the tail light circuit 32 is energized. The contact 60 is directly connected through a conductor 66 with the terminal 34 through which the headlight circuit 36, 38 is energized.

A headed, manually operable plunger 70 is provided for turning on the headlights and the tail lights, only after the ignition switch 14 has been turned to the running position. The plunger 70 is yieldingly urged outward to a rearward normal position by a coil spring 72. When the plunger 70 is thrust forward by the driver to turn on the headlights and the tail lights, this presses the conductive switch component 53 into engagement with the contacts 58 and 60. Engagement of switch component 53 with contact 58 causes current to flow through contact 54, switch component 53, contact 58, conductor 61, relay winding 62, conductor 65 and terminal 30 to the tail lights, and thence to ground. The current flowing through the winding 62 electromagnetically holds the switch component 53 in engagement with the contacts 58 and 60, after the plunger 70 has been released and allowed to return to its normal position. Once the circuit has been closed through actuation of the plunger 70, therefore, it is maintained in operation until the circuit has been in some way manually broken, whereupon the right hand end of the switch component 53 springs rearward to its normal, open position.

So long as the switch component 53 is held closed by the relay winding, a circuit is maintained from the component 53 and contact 60 through the headlights. Immediately upon killing of the engine by the opening of the ignition switch 14, however, not only are the headlights and tail lights extinguished, but current flow through the relay fails, and the switch component 53 springs away from contacts 58 and 60.

Let it be assumed that the memory switch has been used, the ignition has then been turned off, and the key withdrawn. When the key has been reinserted and the ignition switch has been again turned on to start the motor, possibly on a bright clear day, the headlights and tail lights are not automatically reenergized. The effect of the previous activation of the memory switch has been automatically nullified. The memory switch can only be reactivated by first turning on the ignition switch and then manually pressing plunger 70 momentarily. This is a primary feature of the invention.

It is not essential that the current which flows through the relay winding 62 be transmitted to ground through the tail light circuit, since a separate and additional conductive path to ground can be provided for the purpose.

It is important, however, that the relay winding be connected to ground independently of the headlight circuit, because the headlight circuit is at times interrupted as the headlights change from low beam to high beam, and vice versa. If the relay winding were connected in series with the headlight circuit only under such an arrangement, any shifting of the switch member 40, causing interruption of current flow, would cause the headlights to be unintentionally extinguished—a very grave situation if the memory switch is being used at night. With the arrangement shown this danger is obviated because the tail lights remain steadily on. The memory switch is therefore fully available for night driving as well as day driving. There is absolutely nothing useful that can be done through the slide switch 23 with the motor in operation, that cannot be done equally well, and with better assurance against battery drainage, through the memory switch. The slide switch 23 may therefore be relegated to the status of a parking switch and of a standby or reserve switch.

There will be times during daytime driving when it will be desirable to activate the headlights and the tail lights through the memory switch just before entering a tunnel, and then to render the switch inactive promptly upon emerging from the tunnel. The operator could extinguish the lights by momentarily turning the ignition switch off without stopping the vehicle, relying on the momentum of the vehicle to reestablish normal operation of the motor after a prompt reclosing of the ignition switch. That, however, would not be a safe or acceptable way of operating the vehicle, especially in heavy traffic.

In accordance with the illustrative form of the invention, provision is made for voluntary opening of the memory switch while the motor is running, and this without disturbing the closed condition of the ignition switch. For this purpose the memory switch is desirably provided with a second plunger 74 which overlies the left end of switch component 53. The plunger 74 is urged rearward to its normal position by a coil spring 76. When it is desired to render the memory switch inactive, the plunger 74 is thrust forward, moving the switch component 53 out of engagement with contact 54. This causes a failure of current through winding 62, so that switch component 53 is free to spring rearward away from contacts 58 and 60, and does so. Release of the plunger 74 enables the switch component 53 to reengage contact 54, but this does not reestablish the circuits to the headlights and the tail lights, because the circuits remain open between 53 on the one hand and 58 and 60, on the other.

The operator must, of course, remember to render the memory switch inactive by operation of plunger 74 upon emerging from the tunnel, but should he fail to do so, no serious harm will result. The battery may receive somewhat less charge than usual, but it will not be drained or damaged, and with the first shutting off of the motor, the desired "lights out" and "switch off" conditions will be restored.

The accessory memory switch unit 50 is desirably so constructed that it can be magnetically attached to the automobile dashboard 52, although other means of attachment may be utilized. The unit 50 comprises a housing or casing 80, composed of front and rear, complementary, electrically impermeable metallic sections 82 and 84. A magnet comprising a U-shaped metallic member 86, and an associated magnetized block 88 contained therein, are affixed exteriorly to the rear wall of the housing 80 by means of headed screws 90 (one shown). An insulating sheet 92 of suitable material such as fiber board or an appropriate plastic, coextensive with the rear wall of the housing, is adhered to such rear wall and has adhered to it the relay winding 62, together with a permeable core 93 upon which the relay coil is wound. The other parts of the memory switch unit are carried by the forward housing section 82.

A spacer and mounting sheet 94 of insulating material, provided with suitable clearance openings, is adhered to the inner face of the forward wall of the housing section 82, and a similar insulating mounting sheet 96 is adhered to the rear face of the spacing sheet 94. The contacts 54, 58 and 60, together with the connected terminals of conductors 55, 59 and 66, respectively, are secured to the sheet 96 by rivets 98. The middle of the switch component 53, together with a spacer block 100, is attached to the sheet 96 by rivets 102. The plunger 70 has a stop nut 104 threaded on its inner end, and a head 106 threaded on its outer end. The coil spring 72 surrounds the plunger and is interposed between the forward face of the housing 80 and the head 106. The construction and arrangement of the plunger 74 may be the same as that of the plunger 70.

It is not essential that the conductors 55, 65 and 66 be directly connected to the terminals 56, 30 and 34, respectively, if connections can be more conveniently made to readily identifiable wires or other conductors which are already dependably connected to the headlight and tail light inputs. Neither is any convenient way of mounting the unit 50 on the dashboard arbitrarily excluded. The magnetic mounting is, however, extremely fast, convenient and versatile, and is sufficiently secure to be dependably maintained.

The term "ignition switch" as used herein is not intended to be necessarily limited to the very conductive elements through which electrical energy is furnished to the ignition system, but to be applicable to any battery connected switch structure which is operated by the ignition switch actuator.

I have described what I believe to be the best embodiments of my invention. I do not wish, however, to be confined to the embodiments shown, but what I desire to cover by Letters Patent is set forth in the appended claims.

What is claimed is:

1. A comprehensive, battery protective, electrical operating and control system for all the running lights of an automotive vehicle having an internal combustion engine, an electrical ignition system for the engine, an ignition switch, and an actuator for the ignition switch which must be placed and maintained in an operating position for the engine to be operative, and which is shifted to a normal non-operating position for terminating operation of the engine; said operating and control system for the running lights comprising, in combination:

(a) all the running lights themselves, including both high and low beam headlights, and tail lights, (b) a storage battery which furnishes electrical energy through the ignition switch to the ignition system, and which also furnishes electrical energy to the running lights, (c) the ignition switch actuator, which has an engine operating position and a normal non-operating position, (d) a memory switch, (e) means conductively connecting the memory switch in circuit between the battery and all the running lights in such manner that all the electrical energy furnished to all the running lights may be caused to pass through the memory switch, said memory switch including movable conductive means normally biased to an open condition, and requiring to be manually operated to a closed condition and to be retained by a holding means in that condition in order to energize the running lights, and (f) said holding means operatively associated with the ignition switch actuator and the memory switch for holding the movable conductive means of the memory switch in closed condition when, with the ignition switch actuator in engine operating position, the movable conductive means of the memory switch is manually closed;

the construction and arrangement being such that said holding means is rendered ineffective and incapable of holding the memory switch closed by the movement of the ignition switch actuator into the normal, non-operating position, but has that capability restored by the placing of the ignition switch actuator in operating position and the effectiveness restored by the subsequent manual closing of the memory switch.

2. A comprehensive, battery protective, electrical operating and control system for all the running lights of an automotive vehicle which is driven by an internal combustion engine and equipped with an ignition system, an ignition switch through which electrical energy is furnished to the ignition system, and an actuator for the ignition switch which is movable between a normal non-operating position in which a key may be inserted in and withdrawn from said actuator and other positions including an engine operating position; said light operating and control system comprising, in combination:
  (a) all the vehicle running lights, including both high beam and low beam headlights, and tail lights,
  (b) a storage battery for furnishing electrical energy to the ignition system and to the running lights,
  (c) the ignition switch actuator,
  (d) a memory switch having movable and fixed conductive means with the former normally biased to open condition, but manually operable to closed condition,
  (e) conductive means for connecting a first terminal of the battery to the memory switch under the control of the ignition switch actuator, at least when the ignition switch actuator is in engine operating position but not when the ignition switch actuator is in the normal non-operating position,
  (f) a memory switch holding relay connected in series with the memory switch and constructed and arranged to be energized by, and to depend for its holding power upon, current which flows through the memory switch when the ignition switch actuator is in position to cause electrical energy to be transmitted to the memory switch, and the memory switch is closed, for retaining the memory switch in closed condition, and
  (g) conductive means providing distinct conductive paths from the memory switch to the headlights and from the memory switch to the tail lights, and connecting both the headlights and the tail lights to a second terminal of the battery;
  the construction and arrangement being such that all previously illuminated running lights are extinguished, the memory switch is restored to its normal, open condition, and the switch holding relay is de-energized, either by the movement of the ignition switch actuator to the normal non-operating position, or by the opening of the memory switch; and the running lights, the memory switch and the switch holding relay will so remain until, with the ignition switch actuator located in a position in which it can permit energy to be transmitted to the memory switch the memory switch is thereafter manually closed;
  whereby inadvertent operation of the running lights through the control system with the ignition switch actuator in the normal non-operating position is prevented, so that draining of the battery by the running lights is prevented, and unintended turning on of the running lights by the mere movement of the ignition switch actuator to the engine operating position is avoided.

3. A comprehensive, battery protective, electrical operating and control system as set forth in claim 2 which further includes provision for manually causing the reopening of the memory switch and the extinguishing of all illuminated running lights with the ignition switch actuator in the operating position.

4. A comprehensive, battery protective, electrical operating and control system as set forth in claim 3 in which the provision for manually causing the reopening of the memory switch with the ignition switch actuator in operating position includes a switch connected in series with the holding relay so that all the current which flows through the relay must flow also through the switch, and having a movable conductive member which is normally biased to a closed position; and manual means for moving such movable conductive member momentarily to an open position.

5. A comprehensive, battery protective, electrical operating and control system as set forth in claim 2 in which the conductive means providing the conductive path from the memory switch to the tail lights includes the memory switch holding relay.

6. A comprehensive, battery protective, electrical operating and control system as set forth in claim 2 in which the fixed conductive means of the memory switch comprises two distinct output contacts for the headlights and the tail lights, respectively, having no electrical connection with one another so long as the memory switch is in its normal, open condition.

7. In an automotive vehicle having an internal combustion engine, an ignition system, an ignition switch, and ignition switch actuator which is operable between an operating position and a normal non-operating position, and a battery; the combination which includes
  (a) the battery,
  (b) the ignition switch,
  (c) the ignition switch actuator,
  (d) a lighting system including front parking lights, tail lights, and low beam and high beam headlights,
  (e) conventional means for controlling and operating said lights, including a main composite light switch having an "off" position in which no lights are energized through it, a parking position in which the front parking lights and the tail lights are connected through it for energization by the battery, and a running light position in which the running lights, i.e., the tail lights and a choice of either the high beam or the low beam headlight, are connected through distinct conductors for energization by the battery through it, and
  (f) a comprehensive, battery protective, supplemental control system for the running lights only which may be used as a complete and adequate substitute for the running light control provided by the main composite switch of the conventional light control system; comprising a memory switch which has its input side connected to the battery under the control of the ignition switch actuator, so that operative connection is established when the actuator is in the operating position but is broken when the actuator is in the normal non-operating position, separate conductors connecting the output side of the memory switch, respectively, to separate conductors which run from the output side of the composite switch of the conventional light control system to the tail lights and to the headlights, respectively, the memory switch including stationary and movable conductive means, with the latter normally biased to an open position but manually operable to a closed position, electromagnetic means including a coil disposed in series with the memory switch for energization by a portion, at least, of the current which flows through the memory switch, and effective, when the ignition switch actuator is in operating position and the memory switch has been manually closed, to retain the memory switch indefinitely in a closed condition;
  the construction and arrangement being such that the supplemental control system is rendered ineffective and incapable of energizing the running lights and of holding the movable conductive means of the memory switch closed by the movement of the ignition switch actuator to the normal non-operating position, but has that capability restored by the movement of the ignition switch actuator to operating position, followed by the manual closing of the memory switch;
  the conductors for conducting current from the output side of the memory switch to the headlights and to the tail lights, respectively, being insulated from one another at the output side of the memory switch, so that series flow of current from the tail light output of the composite switch to the headlights through said conductors is prevented, and the original capability of the conventional composite switch to cause energization only of the parking lights and the tail lights in one switch position, and only of the headlights and the tail lights in another switch position, is unimpaired by the supplemental control system.

8. As an article of commerce, a compact, battery protective, accessory, memory switch unit, for use in the control and operation of all of the running lights, including both tail lights and high beam and low beam headlights, of an automotive vehicle of the kind which is propelled by an internal combustion engine and which includes an ignition system, an ignition switch, an ignition switch actuator operable between an operating position and a normal non-operating position, and a battery for furnishing electrical energy under the control of the ignition switch actuator to the ignition system, and for furnishing electrical energy to the running lights of the vehicle; said accessory unit including, in combination:

(a) a memory switch having movable and fixed conductive means disposed for engagement with one another, the movable conductive means being normally biased to an open position out of engagement with the fixed switch means, but manually operable to a closed position in which it engages the fixed switch means, (b) an input conductor for connecting the input side of the memory switch to the battery under the control of the ignition switch actuator, (c) a holding relay means for retaining the movable switch means in closed position, including a relay winding which is disposed in series with the memory switch and with said input conductor, the normally open movable switch means and the relay being so operatively related to one another that the manual closing of the movable, normally open switch means, when the unit is operatively applied to a vehicle and the ignition switch actuator is in running position, causes energization of the relay winding, and such energization of the relay winding holds the movable, normally open, but manually closed, switch means in closed position, (d) manually operable means operatively associated with the movable switch means for effecting the closing and opening of the movable switch means at will, (e) conductors attached to the output side of the memory switch for separately connecting the switch to the headlights and to the tail lights, respectively, and (f) means for mounting the unit on a vehicle dashboard in a position conveniently accessible to the operator.

9. As an article of commerce, a compact, battery protective, accessory, memory switch unit as set forth in claim 8 which further includes (g) a housing, supporting and enclosing the memory switch and the holding relay means, and forming, together with the mounting means, a common support for all the elements of the accessory switch unit.

10. As an article of commerce, a compact, battery protective, accessory, memory switch unit as set forth in claim 8, in which the means for manually opening the normally open conductive means of the memory switch includes a second switch disposed in series with the holding relay, a movable conductive member normally biased to closed condition, and a manual actuator operable to displace such member, at least momentarily, to an open position, thereby to interrupt the flow of current through the relay winding for permitting the normally open conductive means of the memory switch to shift to open position.

11. As an article of commerce, a compact, battery protective, accessory, memory switch unit as set forth in claim 8, in which the conductors for conducting current to the tail light and to the headlights, respectively, are insulated from one another at the output side of the memory switch, so that series flow of the current from the tail light conductor through the headlight conductor when the memory switch is open would be precluded.

References Cited

UNITED STATES PATENTS

| 1,622,042 | 3/1927 | Miles et al. | 335—187 X |
| 2,910,621 | 10/1959 | Paule | 315—82 |

JAMES W. LAWRENCE, *Primary Examiner.*

P. C. DEMEO, *Assistant Examiner.*

UNITED STATES PATENT OFFICE
CERTIFICATE OF CORRECTION

Patent No, 3,337,768                                      August 22, 1967

Clarence M. Crews

It is hereby certified that error appears in the above numbered patent requiring correction and that the said Letters Patent should read as corrected below.

Column 8, line 14, for "and" read -- an --; line 31, for "headlight" read -- headlights --; column 10, line 31, for "light" read -- lights --.

Signed and sealed this 28th day of November 1967.

(SEAL)
Attest:

Edward M. Fletcher, Jr.                                EDWARD J. BRENNER

Attesting Officer                                             Commissioner of Patents